(12) United States Patent
Johnson

(10) Patent No.: US 7,179,080 B2
(45) Date of Patent: Feb. 20, 2007

(54) TUBE BENDING FIXTURE

(75) Inventor: James Johnson, Gregory, MI (US)

(73) Assignee: Martinrea Industries, Inc., Dexter, MI (US)

( * ) Notice: Subject to any disclaimer, the term of this patent is extended or adjusted under 35 U.S.C. 154(b) by 302 days.

(21) Appl. No.: 10/804,649

(22) Filed: Mar. 19, 2004

(65) Prior Publication Data

US 2005/0208169 A1    Sep. 22, 2005

(51) Int. Cl.
*B28B 21/92*    (2006.01)
(52) U.S. Cl. .................. 425/393; 425/391; 425/392; 425/394; 425/403
(58) Field of Classification Search ............... 425/391, 425/392, 393, 394, 403
See application file for complete search history.

(56) References Cited

U.S. PATENT DOCUMENTS 5,066,212 A * 11/1991 Moran, Jr. .................. 425/145
5,290,166 A * 3/1994 Heatherly ................... 425/173
5,424,015 A * 6/1995 Matsuda et al. ............ 264/130

* cited by examiner

*Primary Examiner*—Joseph S. Del Sole
*Assistant Examiner*—Maria Veronica Ewald
(74) *Attorney, Agent, or Firm*—Gifford, Krass, Groh, Sprinkle, Anderson & Citkowski, P.C.

(57) ABSTRACT

A tube bending fixture having a frame. An upper and lower tube support are both pivotally mounted to the frame between a first and second pivotal position. A bar is slidably mounted to the upper tube support and movable between an extended and a retracted position. At least one lower mandrel is mounted to the lower tube support and is dimensioned to fit within one end of a tube to be bent. At least one upper mandrel is mounted to the slidable bar, and the upper and lower mandrels are aligned with each other when the upper and lower tube supports are in their first pivotal position. The upper mandrel is dimensioned to fit within the second end of the tube to be bent when the bar is in its extended position. A former is secured to the frame and includes a channel which engages a midportion of the tube and conforms to the desired shape of the tube when the first and second tube supports are in their second pivotal position. A locking mechanism selectively retains the upper and lower tube supports in their second pivotal position.

12 Claims, 5 Drawing Sheets

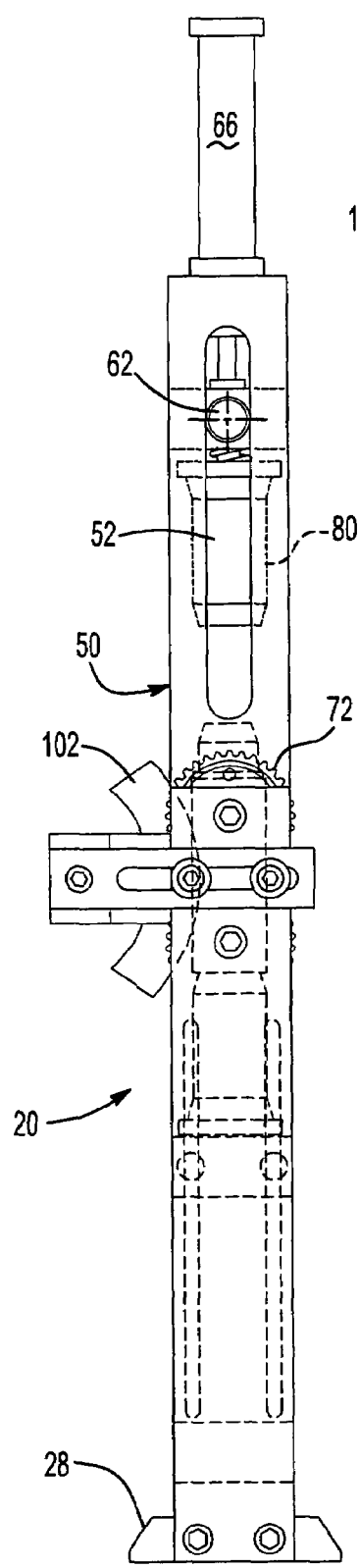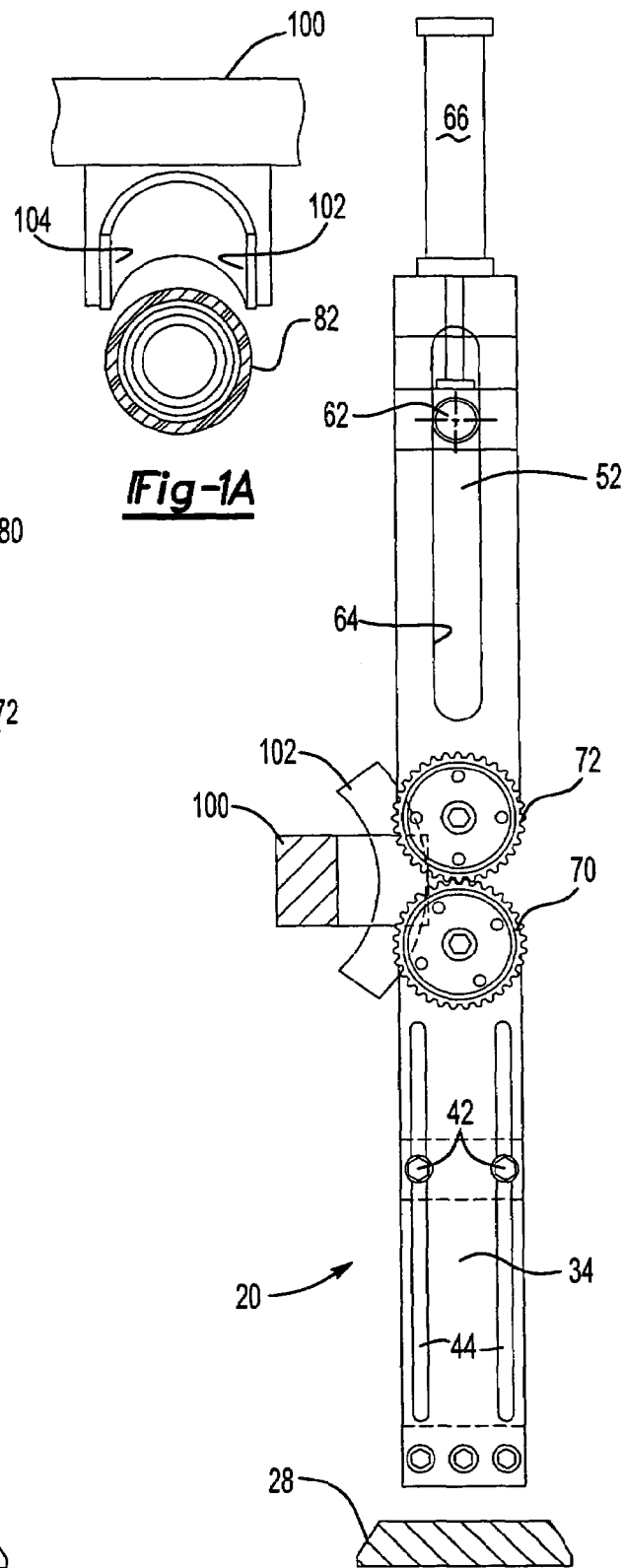
Fig-1A
Fig-2
Fig-3

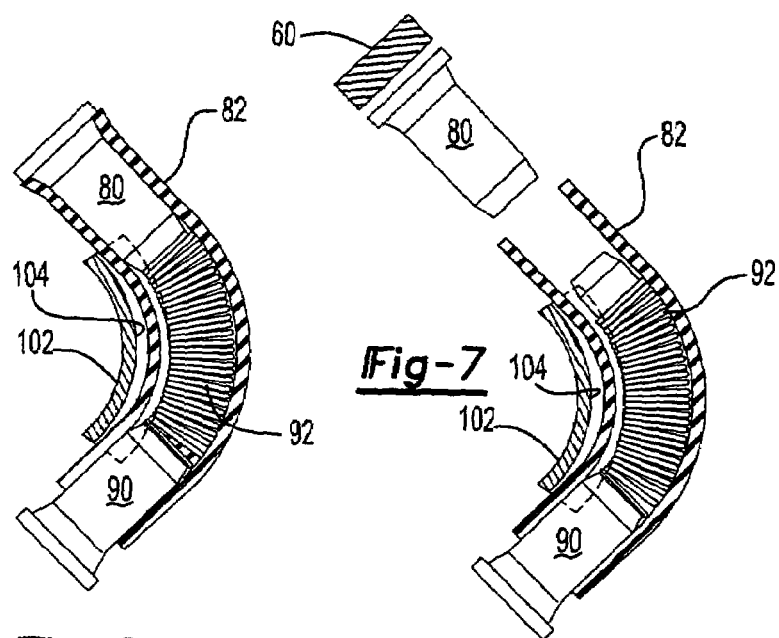
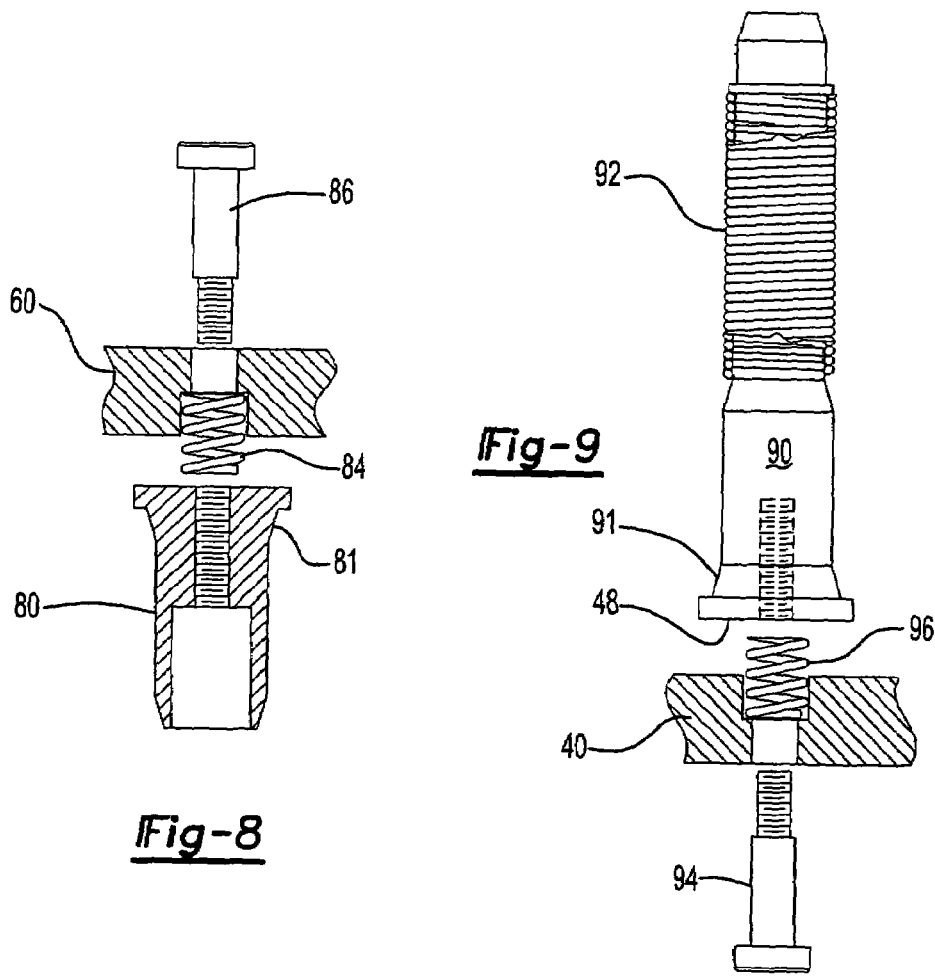

TUBE BENDING FIXTURE

BACKGROUND OF THE INVENTION

I. Field of the Invention

The present invention relates generally to a tube bending fixture.

II. Description of Related Art

Tubes and hoses, i.e. tubes with reinforcing members (hereinafter collectively referred to as tubes) are conventionally manufactured in straight lengths. These straight lengths of tube are then cut to the appropriate length according to the particular application.

In many applications, for example when the tube is used in an automotive vehicle, it is necessary to bend the tube into a predefined shape prior to assembly of the tube in the vehicle. In order to accomplish this, the tubes, after being cut to shape, are typically manually mounted to a former which retains the tube in the desired final bent shape. The former is then placed within an oven which heats the tube to a temperature sufficient to enable the tube to soften and, upon subsequent cooling, retain its desired bent shape. The tube and former are then removed from the oven and, after cooling, the tube is manually removed from the former. Similarly, for thermoset materials, such as thermoset rubber, the tube is placed on the former and then heated to its thermoset temperature. Once the thermoset material has been reached, the tube retains its shape.

While these previously known formers for bending tubes have proven adequate in operation, the tube bending process is labor intensive since the tubes must be individually manually mounted to the former prior to their introduction into the oven and thereafter manually removed from the former following completion of the bending operation. This labor-intensive process increases the overall manufacturing cost of forming the tubes into their desired end shape.

Additionally, the insertion of the former into the tube increases the risk of scoring the inside of the tube. Furthermore, upon removal of the former from the tube, the tube must be temporarily deformed which further adds to variability in shape of the final product.

SUMMARY OF THE PRESENT INVENTION

The present invention provides a tube bending fixture which overcomes all of the above-mentioned disadvantages of the previously known devices.

In brief, the tube bending fixture of the present invention comprises a generally U-shaped frame having a lower tube support pivotally mounted to the frame between a first and second position about a first axis. Similarly, an upper tube support is also pivotally mounted to the frame between a first and second position. A bar is slidably mounted to the upper tube support and is movable between an extended and a retracted position.

At least one lower mandrel is mounted to the lower tube support and is dimensioned to fit within one end of the tube to be bent. Similarly, an upper mandrel is mounted to the bar and the upper and lower mandrels are aligned with each other when the upper and lower tube supports are in their first pivotal position. The upper mandrel is dimensioned to fit within the second end of the tube to be bent when the bar is in its extended position. Conversely, when the bar is in its retracted position, the upper mandrel is spaced from the second end of the tube to facilitate insertion of the mandrels into the opposite ends of the tube. Additionally, at least one of the mandrels preferably includes a flexible portion.

A gear is mounted to the lower tube support about the first axis and, similarly, a second gear is mounted to the upper tube support about the second axis. The first and second gears are in mesh with each other so that the upper and lower tube supports pivot in unison with each other. When the upper and lower tube supports are pivoted to their second position, a lock pin extending between the frame and one of the tube supports retains the upper and lower tube supports in their second pivotal position.

A former is mounted to the frame and registers with a midportion of the tube to be bent. Furthermore, the former includes a channel which conforms with the outer periphery of the tube when the upper and lower tube supports are pivoted to their second position.

After the tubes have been mounted between the upper and lower mandrels and the upper and lower tube supports pivoted to their second position and locked in place, the fixture is placed within an oven for a time sufficient to enable the tubes to thermally soften and, upon subsequent cooling, retain their bent position.

Any desired number of tubes may be simultaneously bent using the tube bending fixture of the present invention by providing multiple pairs of registering upper and lower mandrels on the upper and lower tube supports, respectively.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1A is a fragmentary sectional view taken substantially along line 1A—1A in FIG. 1 and enlarged for clarity;

FIG. 2 is a left view of the preferred embodiment of the present invention;

FIG. 3 is a fragmentary sectional view taken substantially along line 3—3 in FIG. 1;

FIG. 6 is a longitudinal sectional view of a tube during the bending operation;

FIG. 7 is a view similar to FIG. 6, but illustrating the removal of the tube from the tube bending fixture;

FIG. 8 is a fragmentary sectional view illustrating the attachment of an upper mandrel to the tube bending fixture; and FIG. 9 is a fragmentary partial sectional view illustrating an attachment of the lower mandrel to the tube bending fixture.

DETAILED DESCRIPTION OF A PREFERRED EMBODIMENT OF THE PRESENT INVENTION

Figure 1:
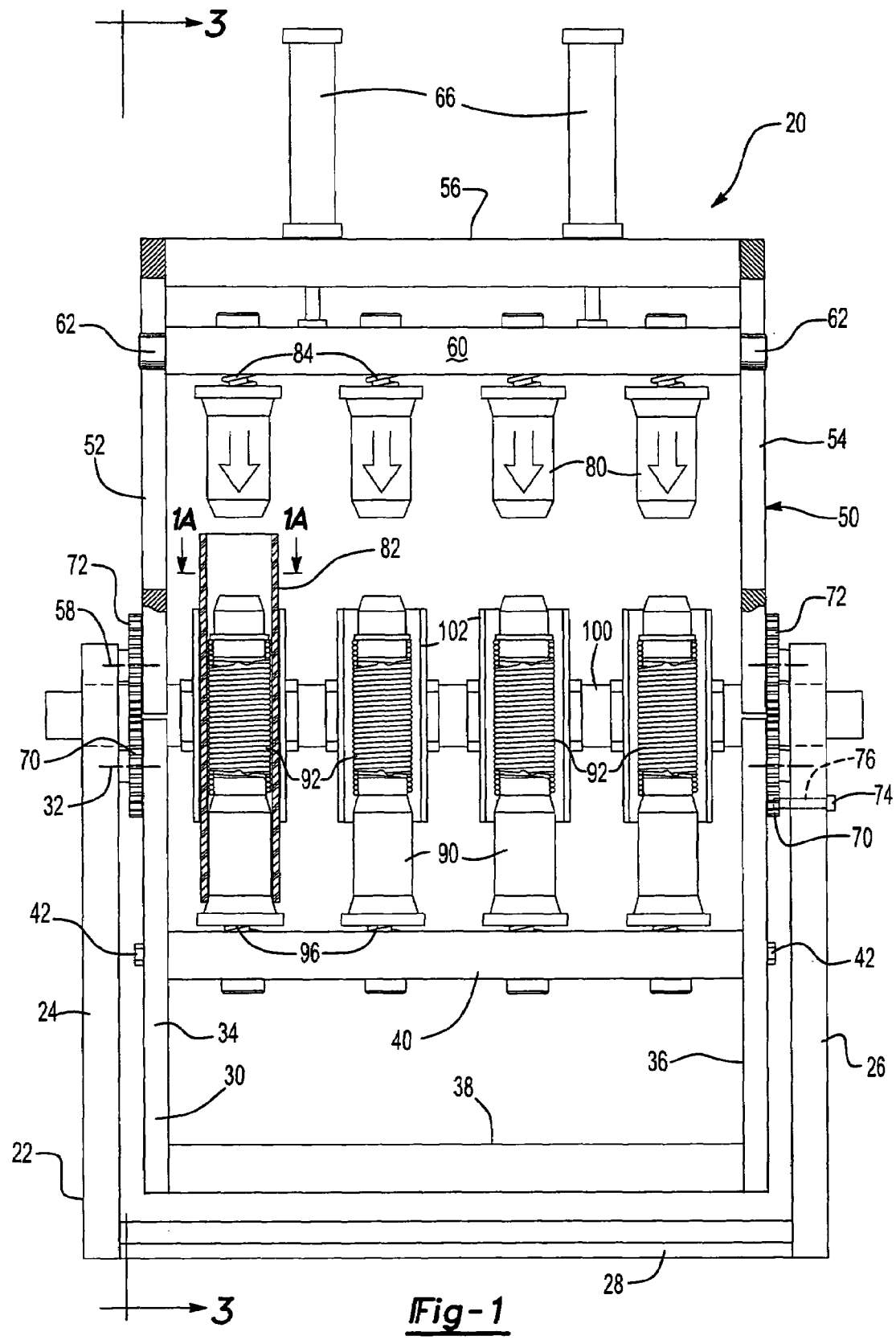
FIG. 1 is a front view illustrating a preferred embodiment of the tube bending fixture of the present invention.

With reference first to FIGS. 1–3, a preferred embodiment of the tube bending fixture 20 of the present invention is illustrated and comprises a generally U-shaped frame 22. The U-shaped frame 22 includes a pair of spaced apart and generally parallel side frame members 24 and 26 as well as a bottom frame member 28 extending between and securing a lower end of the side frame members 24 and 26 together. The frame 22 may be constructed of any desired rigid and thermally stable material, such as aluminum.

A lower and generally U-shaped tube support 30 is pivotally mounted to the frame 22 about a first axis 32. The lower tube support 30 includes a pair of spaced apart and generally parallel side members 34 and 36 as well as a bottom member 38 extending between and securing the lower ends of the side members 34 and 36 together. The opposite or upper ends of the side members 34 and 36 are pivotally secured about an axis 32 to the frame 22.

With reference now particularly to FIGS. 1 and 3, a crossbar 40 extends between and is secured to the side members 34 and 36 of the lower tube support 30 by fasteners 42. Furthermore, as best shown in FIG. 3, these fasteners 42 extend through elongated slots 44 in the side members 34 and 36 and threadably engage the ends of the crossbar 40. Consequently, the longitudinal position of the crossbar 40 relative to the lower tube support 30 may be adjusted by loosening the fasteners 42, adjusting the crossbar 40 and then retightening the fasteners 42 for a reason to be subsequently described.

Figure 4:
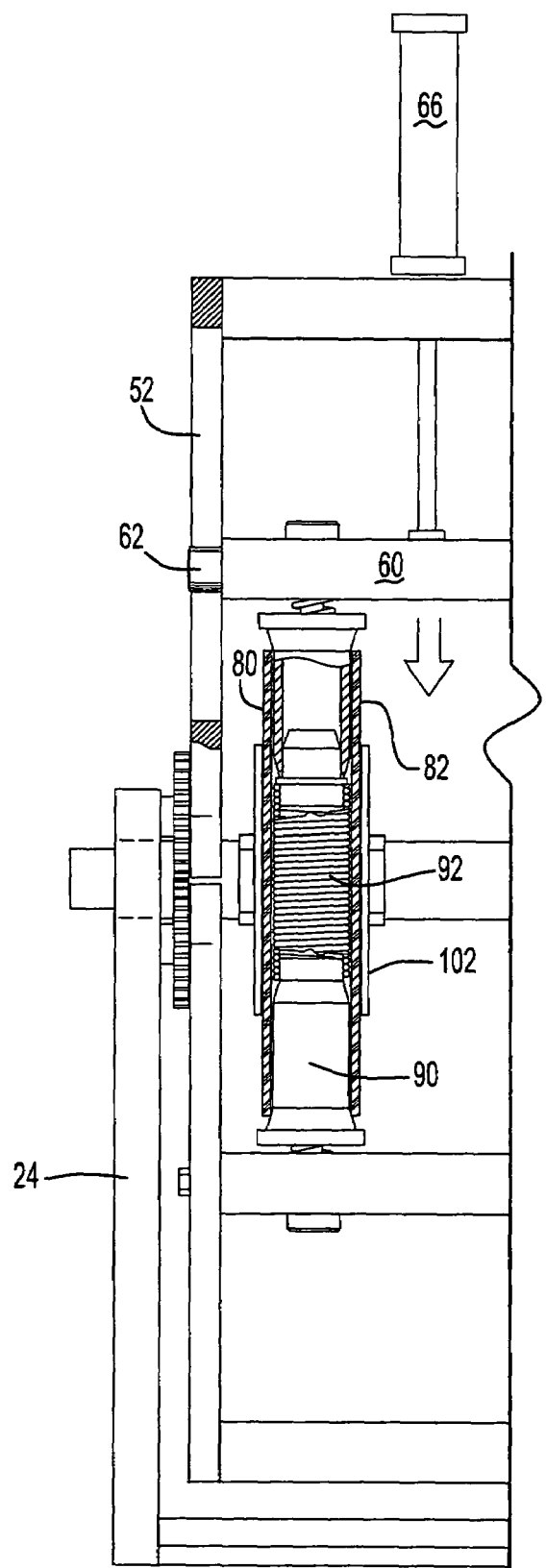
FIG. 4 is a fragmentary partial front sectional view of the preferred embodiment of the present invention.

Referring now particularly to FIGS. 1, 2 and 4, a generally U-shaped upper tube support 50 includes a pair of spaced apart and generally parallel side members 52 and 54 as well as a top member 56 which extends between and secures the upper ends of the side members 52 and 54 together. The opposite or lower ends of the side members 52 and 54 are pivotally mounted to the frame 22 about a second axis 58. The upper tube support 50 is constructed of any rigid and thermally stable material, such as aluminum.

A bar 60 is longitudinally slidably mounted to the side members 52 and 54 of the upper tube support 50 so that the bar 60 is movable between a retracted position, illustrated in FIG. 1, and an extended position, illustrated in FIG. 4. Any conventional means may be used to slidably mount the bar 60 to the upper tube support 50 but, in the preferred embodiment of the invention, the bar 60 includes outwardly extending pins 62 at each end, each of which are slidably mounted within a longitudinally extending slot 64 (FIG. 3) formed in the upper tube support side members 52 and 54, respectively. Any conventional means, such as actuators 66, may be used to move the bar 60 between its retracted position (FIG. 1) and its extended position (FIG. 4).

Figure 5:
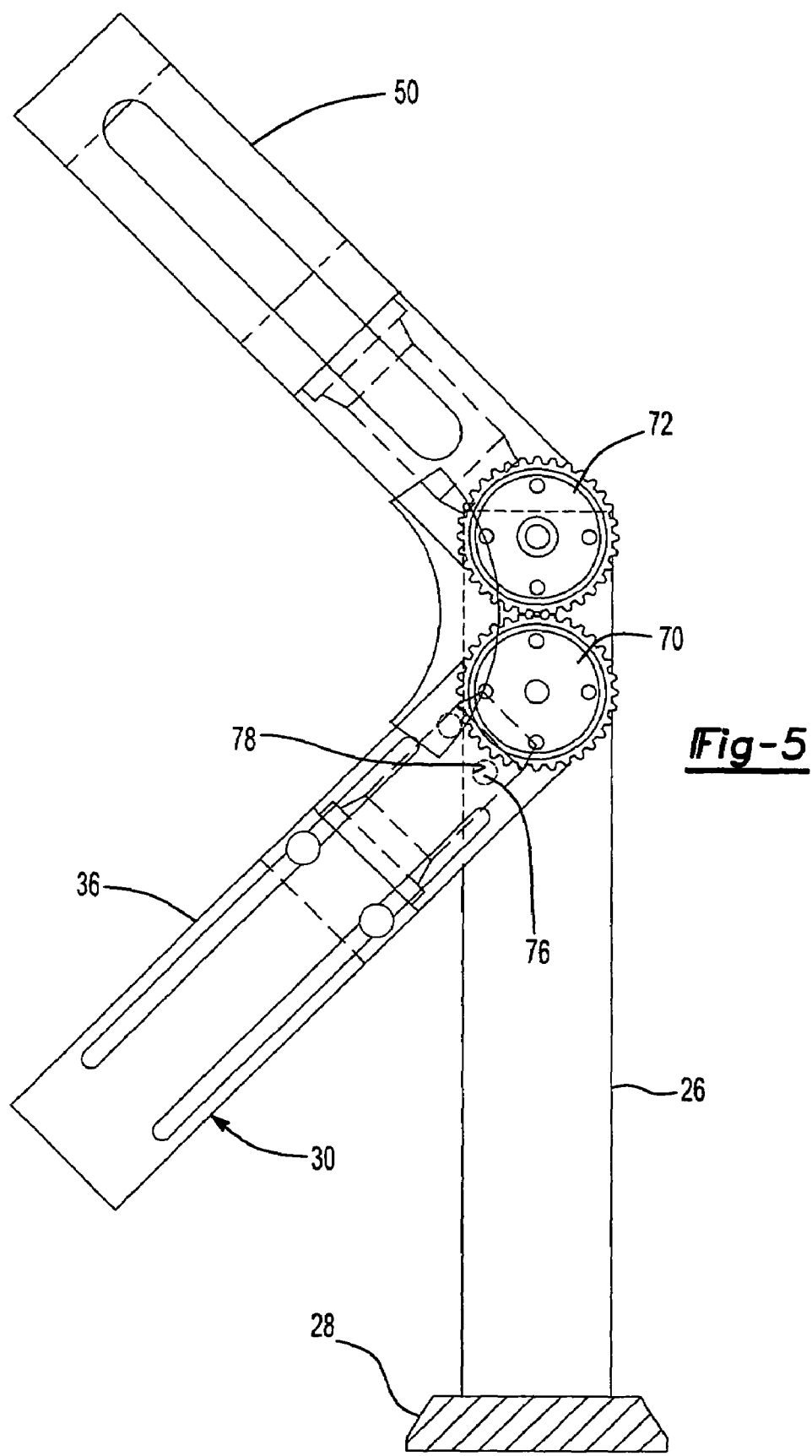
FIG. 5 is a view similar to FIG. 3, but illustrating the tube bending fixture in a tube bending position.

With reference now particularly to FIGS. 1, 3 and 5, a pair of gears 70 are secured to the side members 34 and 36 of the lower tube support 30 such that the gears 70 are coaxial with the first axis 32. Similarly, a pair of gears 72 are secured to the side members 52 and 54 of the upper tube support 50 such that the gears 72 are coaxial with the second axis 58.

Each gear 70 meshes with its aligned gear 72. Consequently, as the lower and upper tube supports 30 and 50, respectively, are pivoted from a first position, illustrated in FIG. 3, to a second pivotal position, illustrated in FIG. 5, the lower tube support 38 and upper tube support 50 pivot in unison with each other.

In order to maintain the lower and upper tube supports 30 and 50, respectively, in a second pivotal position, a locking pin 74 includes a shaft 76 which is disposed through a hole in the frame 26. When the lower and upper tube supports 30 and 50 are moved to their second pivotal position (FIG. 5), the pin shaft 76 registers with and enters an opening 78 formed in the lower tube support side member 36 or 34 thus retaining the lower and upper tube supports 30 and 50 in their second pivotal position.

With reference now to FIGS. 1 and 8, at least one and preferably a plurality of upper mandrels 80 are mounted to the bar 60 so that the mandrels 80 are spaced apart from each other along the bar 60. Furthermore, although four mandrels 80 are illustrated in the drawing, it will be understood that more or fewer mandrels may be used without deviation from either the spirit or the scope of the invention.

Still referring to FIGS. 1 and 8, each mandrel is dimensioned to fit within an upper end of a tube 82 to be bent. Furthermore, as best shown in FIG. 8, each mandrel 80 is secured to the bar 60 by a fastener 86. Preferably, a compression spring 84 is disposed between the bar 60 and the mandrel 80 so that each mandrel 80 is slightly spaced from the bar 60, but compressible relative to the bar 60, for a reason to be subsequently described.

With reference now particularly to FIGS. 1 and 9, at least one and preferably a plurality of lower mandrels 90 are mounted to the crossbar 40 so that one lower mandrel 90 is aligned with one upper mandrel 80 when the upper and lower tube supports 30 and 50 are in their first pivotal position (FIG. 3). Each lower mandrel optionally includes a bendable or flexible portion 92 which is positioned along a midpoint of the tube 82 (FIG. 1) to be bent. This flexible portion 92 may comprise a spring, a corrugated tube section and/or the like.

As best shown in FIG. 9, a fastener 94 extends through the crossbar 40 and threadably engages a lower end of the mandrel 90 in order to secure the mandrel 90 to the crossbar 40. Preferably, the fastener 94 extends through a compression spring 96 so that the lower end 98 is spaced apart from the crossbar 40 as best shown in FIG. 1. However, the compression spring 96 allows the lower end 98 to compress against the bar 40 for a reason to be subsequently described.

With reference now particularly to FIGS. 1 and 2, a crossbeam 100 extends and is secured to the side members 24 and 26 of the frame 22 in between the pivotal axes 32 and 58 of the tube bending supports 30 and 50. A plurality of formers 102 are then secured to the crossbeam 100 so that one former 102 is associated with each pair of upper and lower mandrels 80 and 90, respectively.

As best shown in FIG. 1A and FIG. 6, each former 102 includes an arcuate channel 104 which conforms in shape and size to the outer periphery of the tube 82 to be bent. Furthermore, when the tubes 82 are positioned on the lower mandrels as shown in FIG. 1, each former 102 is aligned with the optional flexible portion 92 of the lower mandrel 90.

In the event that a flare is desired at one or both ends of the tube 82, the mandrels 80 and/or 90 may include a flared portion 81 and 91, respectively (FIGS. 8 and 9).

In operation, the lower and upper tube supports 30 and 50, respectively, are first moved to near their first pivotal position (FIG. 3) and the bar 60 is moved to its retracted position (FIG. 1). The tubes 82 to be bent are then positioned onto the lower mandrels 90. The tube supports 30 and 50 are then moved to their first position so that the upper and lower mandrels are aligned with each other.

The bar 60 is then moved to its extended position, illustrated in FIG. 4, such that one upper mandrel 80 is inserted within the upper end of each tube 82. At this time, the optional flexible section 92 of the lower mandrel 90 is aligned with the former 102.

The upper tube support 50 is then pivoted to its second position as illustrated in FIG. 5. The upper tube support 50 may be pivoted either manually or through the use of actuators. The pivotal action of the upper tube support 50 simultaneously pivots the lower tube support 30 to its second pivotal position due to the coaction of the gears 70 and 72. With the tube supports 30 and 50 in their second pivotal position, the lock pin 74 is moved to its locked position thus locking the tube supports 30 and 50 in their second pivotal position.

As best shown in FIG. 6, with the lower and upper tube supports 30 and 50 in their second pivotal position, the tube to be bent 82 is moved to its desired bent form or a percentage overbend to compensate for elastic tendencies in the tube material. Simultaneously, the optional flexible section 92 of the lower mandrel 90 supports the interior of the tube 82 from collapsing during the bending operation while the former 102 supports the outer periphery of the tube 82.

The tube bending fixture 20 with its bent tubes 82 is then positioned within an oven. The oven heats the tubes 82 to a temperature sufficient for the thermoplastic tubes 82 to soften and thereafter, upon cooling, retain their bent shape or to the temperature necessary to cure the thermoset material if the tubes 80 are made of a thermoset material. Furthermore, during the heating operation of the tubes 80, the tubes elongate slightly due to thermal expansion. However, the springs 84 and 96 (FIGS. 8 and 9) enable the mandrels 80 and 90, respectively, to move apart from each other in order to accommodate any longitudinal thermal expansion of the tube 82. The springs 84 and 96 also compensate for variability in the cut length of the tube prior to forming, without affecting the bend created.

After the heating operation, the fixture 20 is removed from the oven. If the tubes 82 are made of a thermoplastic material, the tubes 82 are allowed to cool. Optionally, the lock pin is disengaged and the bar 60 is then moved to its retracted position, as illustrated in FIG. 7, thus removing the upper mandrel 60 from the upper end of the tube 82. Thereafter, the tube 82 is removed from the lower mandrel 90 after which the lower and upper tube supports 30 and 50 are moved to their first pivotal position and the above process is repeated.

It will be appreciated that the tube bending fixture 20 of the present invention may be adjusted to accommodate tubes of different lengths. For example, shorter or longer tubes may be accommodated by simply repositioning the crossbar 40 (FIG. 1) on the lower tube support 30. This is simply, easily and rapidly accomplished by merely loosening the fasteners 42, readjusting the crossbar 40 and then retightening the fasteners 42.

Likewise, by adjusting the positions of the bar 60 (FIG. 1) between its retracted and its extended position, the upper mandrels 80 may be used to engage tubes 82 of varying lengths and varying bend angles.

Having described my invention, however, many modifications thereto will become apparent to those skilled in the art to which it pertains without deviation from the spirit of the invention as defined by the scope of the appended claims.

I claim:

1. A tube bending fixture comprising: a frame, a lower tube support pivotally mounted to said frame between a first and a second position about a first axis, an upper tube support pivotally mounted to said frame between a first and a second position about a second axis, a bar slidably mounted to said upper tube support and movable between an extended and a retracted position, a plurality of lower mandrels mounted to said lower tube support, each lower mandrel dimensioned to fit within one end of a tube to be bent, a plurality of upper mandrels mounted to said bar, one of said upper and one of said lower mandrels being aligned with each other when said upper and lower tube supports are in said first pivotal position, each said upper mandrel dimensioned to fit within a second end of the tube to be bent when said bar is in said extended position, each said upper mandrel being spaced from the second end of the tube to be bent when said bar is in said retracted position, a lock mechanism which selectively retains said upper and lower tube supports in said second pivotal position, a first gear secured to said lower tube support coaxial with said first axis and a second gear secured to said upper tube support coaxial with said second axis, wherein said first and second gear are in mesh with each other so that said upper tube support and said lower tube support pivot in unison with each other relative to said frame.

2. The invention as defined in claim 1 wherein said lock mechanism comprises a lock pin mounted to said frame which selectively engages an opening in one of said tube supports when said tube supports are in said second pivotal position.

3. The invention as defined in claim 1 wherein said frame is U-shaped having two spaced apart and parallel side frame members and a bottom frame member.

4. The invention as defined in claim 3 wherein said lower tube support is U-shaped having two spaced apart and parallel side members and a bottom member.

5. The invention as defined in claim 4 and comprising a crossbar extending between said side members of said lower tube support and means for adjustably securing said crossbar to said side members of said lower tube support, wherein said at least one lower mandrel is mounted to said crossbar.

6. The invention as defined in claim 5 wherein said adjustable securing means comprises a slot formed in each side member of said lower tube support and a pair of fasteners, one fastener extending through each slot and engaging said crossbar.

7. The invention as defined in claim 1 and comprising at least one former attached to said frame, said former having a channel which engages an intermediate port of a tube mounted to said upper and lower mandrels, said channel conforming in desired shape to the tube when said upper and lower tube supports are in said second pivotal position.

8. The invention as defined in claim 7 wherein said lower mandrel includes a bendable portion which registers with said former.

9. The invention as defined in claim 8 wherein said bendable portion of said lower mandrel comprises a spring.

10. The invention as defined in claim 8 wherein said bendable portion of said lower mandrel comprises a corrugated metal section.

11. The invention as defined in claim 1 and comprising a spring-loaded mount which secures said lower mandrel to said lower tube support.

12. The invention as defined in claim 1 and comprising a spring-loaded mount which secures said upper mandrel to said bar.

* * * * *